United States Patent
Gillis et al.

(10) Patent No.: US 6,266,199 B1
(45) Date of Patent: Jul. 24, 2001

(54) METHOD OF APPARATUS TO CHARACTERIZE AND LIMIT THE EFFECT OF DISK DAMAGE IN A HARD DISK DRIVE

(75) Inventors: Donald Ray Gillis, San Jose; Richard Mark Kroeker, Morgan Hill; Mike Suk, Milpitas; Reinhard Ferdinand Wolter, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/313,832

(22) Filed: May 18, 1999

(51) Int. Cl.$^7$ ................................ G11B 27/36; G11B 5/09
(52) U.S. Cl. .................................. 360/31; 360/46; 360/53
(58) Field of Search .................................. 360/31, 53, 46, 360/25, 67

(56) References Cited

U.S. PATENT DOCUMENTS

| 4,872,071 | 10/1989 | Easton et al. ....................... 360/67 X |
| 5,856,983 | * 1/1999 | Okazaki ................................ 360/46 |
| 5,923,485 | 7/1999 | Ito ........................................ 360/31 |

FOREIGN PATENT DOCUMENTS

| 55-113112 | 9/1980 | (JP) ........................................ 360/53 |
| 3-194765 | 8/1991 | (JP) ........................................ 360/67 |
| 4-330603 | 11/1992 | (JP) ........................................ 360/67 |

OTHER PUBLICATIONS

IBM TDB, "Prevention of Hard Errors in Magnetic Filed Due to Long Term Degradation", 3/87, v.29 n.10, pp.4577ff.

* cited by examiner

Primary Examiner—Regina Y. Neal
(74) Attorney, Agent, or Firm—Noreen A. Krall; Robert B. Martin

(57) ABSTRACT

A method and apparatus for monitoring the quality of the readback signal of data written on a magnetic recording disk in a disk drive and for limiting data loss due to physical damage at a slider/disk interface. The amplitude of a read signal is continuously monitored in the read channel, either by directly measuring the read signal amplitude or by monitoring the amplification level of the automatic gain control (AGC) circuit in the read channel which is inversely proportional to the read signal amplitude. If the amplitude of the monitored read signal decreases below a chosen level, the location of the data on the disk track is flagged as possibly damaged. The data is rewritten at the same location and then reread to see if full recovery of the degraded data is possible. If the amplitude read signal of the rewritten data is greater than a chosen level, the disk track is judged to be usable and normal operation continues. If the amplitude of the rewritten data read signal is less than the chosen level, permanent damage of the location on the data track is assumed and the data is rewritten at a new location on the magnetic recording disk.

2 Claims, 3 Drawing Sheets

METHOD OF APPARATUS TO CHARACTERIZE AND LIMIT THE EFFECT OF DISK DAMAGE IN A HARD DISK DRIVE

BACKGROUND OF THE INVENTION

1. Field of the Invention

This invention relates in general to disk drives, and in particular to a method to characterize and limit the effect of disk damage due to head/disk contact in a hard disk drive.

2. Description of Related Art

Moving magnetic storage devices, especially magnetic disk drives, are the storage devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

The need for higher data density on magnetic disks has imposed a requirement to read and write more data on narrower tracks located on the disk. The achievement of higher data density requires increasingly narrower transducer gaps and increasingly less spacing or clearance, commonly called flying height, between the magnetic transducer and the disk recording surface. In normal operation of the systems designed to reliably record and read data at the higher data density, a magnetic head slider flies on an air bearing about 30 nanometers away from the disk surface. Should the head slider develop abnormal flying characteristics, it can contact the disk surface causing damage to both the head and disk which may lead to damage which results in the loss of stored data.

Various methods are found in the prior art for detecting the high probability of failure as described above. For example, the prior art describes methods and apparatus to measure the flying height of the magnetic heads and providing a warning for taking corrective action when the measurement of flying height indicates an imminent failure condition. IBM's U.S. Pat. No. 4,777,544 granted to Brown et al. describes a harmonic ratio flyheight technique for calculating head/disk spacing. IBM's U.S. Pat. No. 5,410,439 granted to Egbert et al. describes a method and apparatus for measuring head/disk clearances in a disk drive and providing warning of impending failure caused by a head/disk "crash".

Other methods for detecting impending failure include methods of monitoring the readback signal amplitude of heads in a disk drive and comparing with a preset amplitude to monitor disk magnetic coating degradation. These methods assume that loss of readback signal amplitude is associated with disk surface physical damage (for example, abrasive wear damage) caused by the slider contacting the disk and data is either rewritten at a different location or the disk drive is shutdown before a crash occurs.

However, in some situations readback signal degradation may be due to thermal effects caused by head/disk contact or to accumulated effects of small stresses from stray magnetic fields, etc. In these situations, the prior art approaches are not applicable because readback signal degradation is not associated with physical damage of the head/disk interface and the integrity of the disk drive is not at risk.

It therefore can be seen that there is a need for a method and apparatus for monitoring the readback signal quality and for determining whether signal degradation is due to disk magnetic layer damage or whether signal quality can be restored without compromising data integrity.

SUMMARY OF THE INVENTION

In order to address the problems found in the prior art as described above, it is an object of the present invention to disclose a method and apparatus to monitor a readback signal amplitude of a magnetic read transducer in a magnetic disk drive.

It is another object of the present invention to disclose a method and apparatus to monitor a readback signal amplitude by monitoring the amplification level of an automatic gain control (AGC) circuit in a read channel.

It is a further object of the present invention to disclose a method of analyzing readback signal amplitude degradation to determine whether or not permanent surface damage to the disk has occurred.

In accordance with the principles of the present invention, there is disclosed a method of monitoring the quality of the readback signal amplitude from a magnetic read transducer and of analyzing data tracks on disk surfaces showing signal degradation by refreshing the data and reexamining the quality of the rewritten data. In the preferred embodiment of the invention, the amplitude of a readback signal is monitored by continuously monitoring the level of an automatic gain control (AGC) signal during readback operations. The AGC is a circuit in the signal processor that provides control of the signal amplification in order to maintain a nearly constant signal amplitude to the data channel electronic circuitry. A decrease of the readback signal amplitude results in an increase of the level of the AGC signal and increased amplifier gain in the signal processor circuit.

With commonly used Al—Mg alloy disk substrates, degradation of the readback signal amplitude usually results from physical damage induced by slider contact with the magnetic coating on the disk surface. With the harder glass substrates being used in many disk files, slider contact with the magnetic coating on the disk surface does not always result in the severe physical damage observed with Al—Mg substrates. However, because of the poor thermal conductivity of the glass substrates, head/disk contact may cause severe local heating of the magnetic coating on the disk resulting in readback signal degradation as temperatures approach the Curie temperature of the magnetic coating. Signal degradation by this thermal mechanism is very different from signal degradation by a wear or other physical damage mechanism since the thermal mechanism does not result in permanent damage to the magnetic coating. Therefore, when dealing with glass substrates or other substrates having similar thermal properties, it is critical to determine the probable mechanism of signal degradation before taking remedial action to relocate or to rewrite the affected data.

In the preferred embodiment of the present invention, when the level of the AGC signal in the signal processing channel exceeds a first predetermined level representing a signal amplitude for a critically degraded readback signal, the location on the data track of the degraded signal amplitude data is flagged. The segment of flagged data is then rewritten by the write head on the same location on the flagged segment of the data track. A second read operation is then performed on the newly rewritten data in the flagged location. The level of the AGC signal is again monitored during the second read operation and is compared with a second predetermined level representing a signal amplitude for an acceptable readback signal amplitude. If the level of the AGC signal is smaller than the second predetermined level, the flagged location of the disk surface is judged to be undamaged (readback signal amplitude fully recovered by the rewrite operation) and the rewritten data is left at this location. If, on the other hand, the level of the AGC signal is greater than the second predetermined value, the flagged location of the disk surface is judged to be damaged (readback signal amplitude not fully recovered by the rewrite operation) and the data is moved to a new location and the damaged segment flagged as unusable.

One advantage for implementing the method of the present invention is that it can be performed on the fly during data operations since the readback signal amplitude is constantly monitored.

A further advantage to the present invention is that it is more suitable for use with the harder glass substrates.

The above, as well as additional objects, features, and advantages of the present invention will become apparent in the following detailed written description.

DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
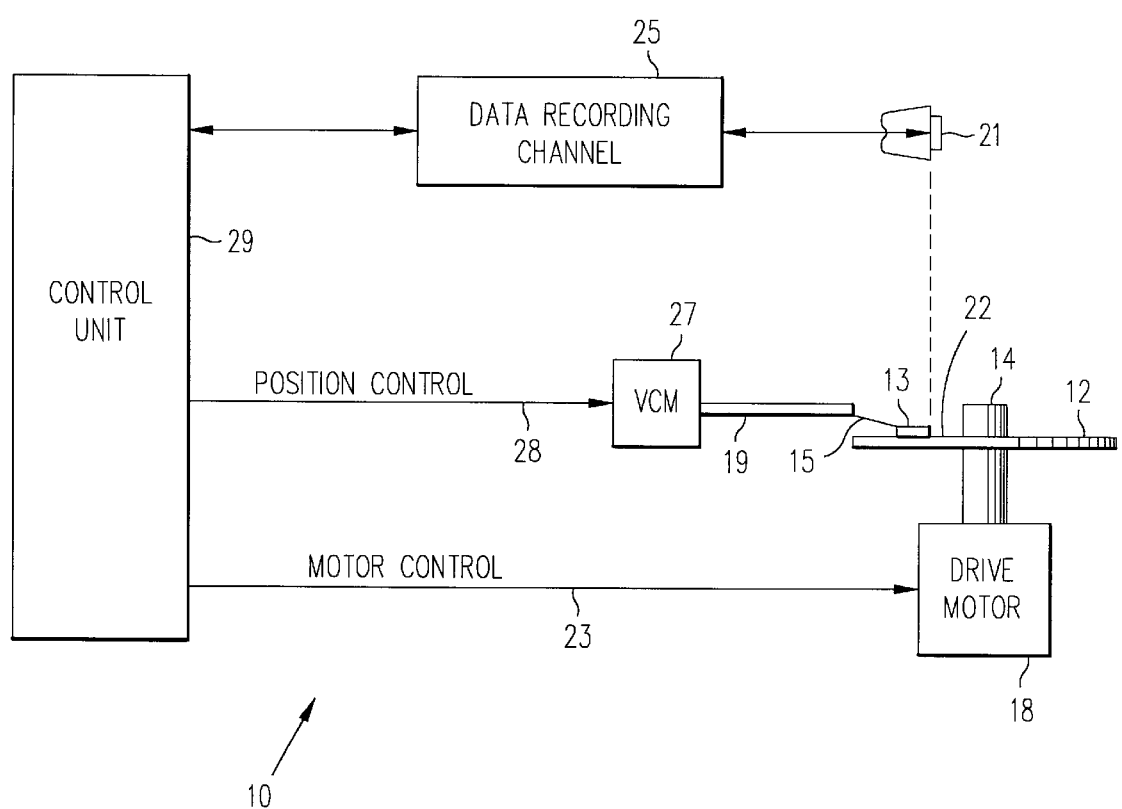
FIG. 1 is a simplified diagram of a magnetic recording disk drive system which incorporates the present invention.

Referring now to FIG. 1, there is shown a disk drive 10 embodying the present invention. As shown in FIG. 1, at least one rotatable magnetic disk 12 is supported on a spindle 14 and rotated by a disk drive motor 18. The magnetic recording media on each disk is in the form of an annular pattern of concentric data tracks (not shown) on the disk 12.

At least one slider 13 is positioned on the disk 12, each slider 13 supporting one or more magnetic read/write heads 21. As the disks rotate, the slider 13 is moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator 27. The actuator as shown in FIG. 1 may be a voice coil motor (VCM). The VCM comprises a coil movable within a fixed magnetic field, the direction and speed of the coil movements being controlled by the motor current signals supplied by a controller 29.

During operation of the disk storage system, the rotation of the disk 12 generates an air bearing between the slider 13 (the surface of the slider 13 which includes the head 21 and faces the surface of the disk 12 is referred to as an air bearing surface (ABS)) and the disk surface 22 which exerts an upward force or lift on the slider. The air bearing thus counter-balances the slight spring force of the suspension 15 and supports the slider 13 off and slightly above the disk surface by a small, substantially constant spacing during normal operation. Alternatively, in some hard disk drives, the air bearing between the slider and the disk surface may be replaced with a fluid bearing in which a suitable fluid, such as for example a film of lubricating oil on the disk surface, which provides an analogous hydrodynamic bearing to support the slider 13 above the disk surface 22 by a small, substantially constant spacing during normal operation.

The various components of the disk drive system are controlled in operation by control signals generated by the control unit 29, such as access control signals and internal clock signals. Typically, the control unit 29 comprises logic control circuits, storage chips and a microprocessor. The control unit 29 generates control signals to control various system operations such as drive motor control signals on line 23 and head position and seek control signals on line 28. The control signals on line 28 provide the desired current profiles to optimally move and position the slider 13 to the desired data track on the disk 12. Read and write signals are communicated to and from the read/write heads 21 by the recording channel 25. Recording channel 25 may be a partial response maximum likelihood (PMRL) channel or a peak detect channel. The design and implementation of both channels are well known in the art and to persons skilled in the art. In the preferred embodiment, recording channel 25 is a PMRL channel.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
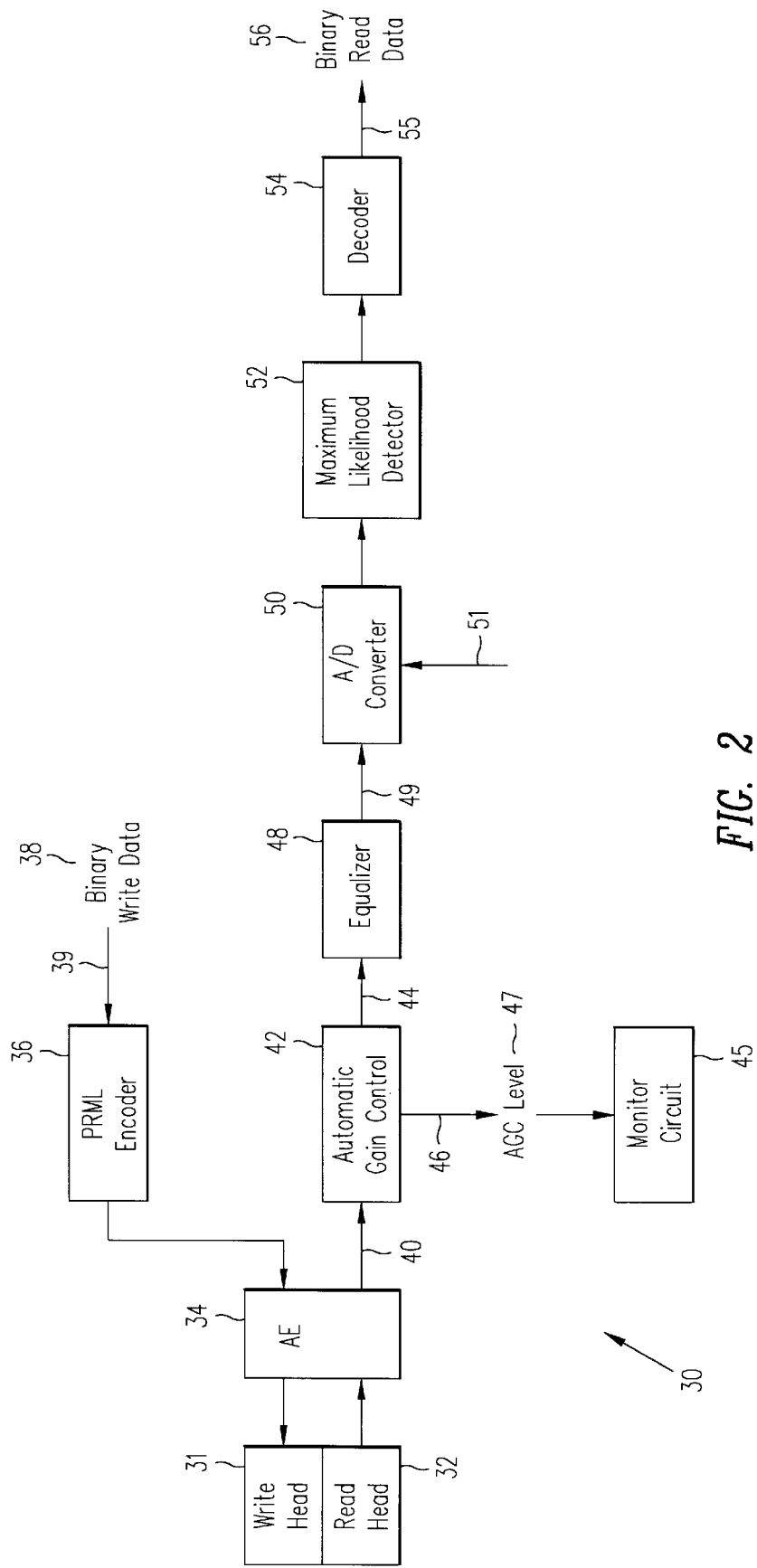
FIG. 2 is a schematic diagram of signal processing electronic circuitry in the readback data processing channel of a disk drive according to an embodiment of the invention.

Reference is now made to FIG. 2, which shows a schematic diagram of the signal processing electronic circuitry in a data processing write/read channel 30 of an exemplary disk drive according to an embodiment of the present invention. A write head 31 is first used to write a number of disk tracks with input binary data 38 provided to the write channel by an input conductor 39. The data 38 is encoded to provide for amplitude sampling data detection during the subsequent reading back of the disk tracks. For example, partial response maximum likelihood (PRML) encoding 36 is used to encode binary write data 38 before the data is written to the disk tracks.

While the construction and arrangement of the write and read channels of FIG. 2 are not to be taken as a limitation on the invention, these two channels both include an arm electronics (AE) circuit 34. As is well known by those skilled in the art, the AE circuit 34 provides a variety of electronic functions, including, for example, amplification of the write/read signal.

Once the disk tracks are written, the read channel, and a read head 32 is used to read back the written encoded data. The read channel of FIG. 2 includes the AE circuit 34, an automatic gain control (AGC) circuit 42 and an equalization circuit 48. As a result of the operation of the AGC circuit 34 and the equalization circuit 48 an analog read signal is present on conductor 49. This analog signal is connected to the input of an A/D converter 50.

In the decoding of the analog read signal, the analog values or amplitudes of the signal are sampled at clock times or intervals of a clock that is provided to the A/D converter 50 by way of a conductor 51. Again without limitation thereto, the read channel shown in FIG. 2 includes a maximum likelihood (ML) detector 52, and a decoder 54. The basic function of the ML detector 52 and the decoder 54 is to decode the output values of the A/D converter 50 into a binary read signal. The binary read data 56 at the output conductor 55 of the decoder 54 comprises the original binary input 38 that was presented to the write channel during the writing of the data to the disk drive.

Degradation of the readback signal amplitude resulting from physical damage induced by slider contact with the disk surface results in a decrease of the amplitude level of the analog read signal output from the AE circuit 34. The AGC circuit 42, which functions to maintain a constant amplitude level of the read signal for further processing in the read channel, increases amplification of the read signal to compensate for the decreased signal level on conductor 40. AGC circuits providing signal amplitude leveling are well known to those skilled in the art. A novel feature of the present invention is to detect the AGC level 47, the level of amplification provided by the AGC circuit 42, on a conductor 46 to provide a signal indicating the readback signal amplitude. The AGC level 47 on conductor 46 is connected to a monitor circuit 45 used in evaluation of the quality of the readback signal amplitude.

In a normal disk drive, the MR element of the read head 32 provides a readback signal having a nominal amplitude $A_0$ in response to written data on a data track on the disk surface. This nominal amplitude readback signal is amplified by a fixed gain factor $G_{AE}$ by the preamplifier in the AE circuit 34 and is transmitted on conductor 40 to the AGC circuit 42. The AGC circuit 42 responds to the signal having this nominal amplitude $G_{AE}A_0$ by supplying further gain factor $G_0$ to provide an output signal having an amplitude level $G_0G_{AE}A_0$ on conductor 44 for further read channel processing. At this nominal signal level, with the AGC circuit 42 providing the gain factor $G_0$, an AGC level signal 47 having a magnitude $L_0$ is produced as an output signal by the AGC circuitry on conductor 46. The magnitude of the AGC level signal 47 is proportional to the gain factor of the AGC circuit 42.

When slider/disk contact damages a portion of the magnetic coating on the disk surface, the physical damage results in amplitude degradation of the readback signal from the damaged portions of the data track. The MR element of the read head 32 provides a degraded readback signal having an amplitude $A_1$ in response to the data written on the damaged portion of the data track. The amplitude $A_1$ of the degraded readback signal from the damaged data track is smaller than the amplitude $A_0$ of the nominal signal read from the normal data track. The degraded readback signal is amplified by the fixed amount $G_{AE}$ by the AE circuit 34 and is transmitted via connector 40 to the AGC circuit 42 as a degraded signal having an amplitude $G_{AE}A_1$ smaller than the nominal signal amplitude $G_{AE}A_0$. The AGC circuit 42 responds to the smaller amplitude level input signal by providing an increased amplification or gain factor $G_1$ to compensate for the smaller than nominal input signal. The circuitry of the AGC circuit 42 provides a gain $G_1$ so that the output amplitude $G_1G_{AE}A_1$ of the degraded readback signal at conductor 44 is equal to the nominal readback signal amplitude $G_0G_{AE}A_0$ for a signal from a normal data track. Therefore, since the AGC circuit 42 provides that $G_1G_{AE}A_1=G_0G_{AE}A_0$, it is seen that the AGC gain factor $G_1$ has a magnitude $G_0A_0/A_1$ in order to just compensate for the smaller magnitude of the input readback signal. The value of the AGC level signal 47 which is proportional to the gain factor of the AGC circuit 42 increases from a magnitude $L_0$ for a normal readback signal to a magnitude $L_1=L_0A_0/A_1$. It can be seen that the value of the AGC level signal 47 is inversely proportional to the amplitude of the readback signal detected at the read head 32.

Since AGC circuits are commonly used in the read channel of disk drives, use of the AGC gain level to monitor the readback signal amplitude level provides a convenient and inexpensive method of monitoring the condition of the written data on the magnetic coating on the disk surface during normal readback operation of the disk drive. Deviations of the AGC level signal 47 from the nominal magnitude $L_0$ may be used as indications of abnormal conditions such as magnetic coating physical damage due to slider/disk contact. Although in the embodiment described above, only changes in read signal amplitude due to physical damage have been discussed, other abnormalities leading to signal amplitude changes may also be detected and monitored by means of the AGC level 47. For example, changes in the flying height (clearance) of the slider over the disk due to debris accumulation on the slider or other damage to the slider or suspension can result in increases or decreases in the read signal amplitude. These abnormalities may also be detected and monitored by use of the AGC level signal of the present invention.

Figure 3:
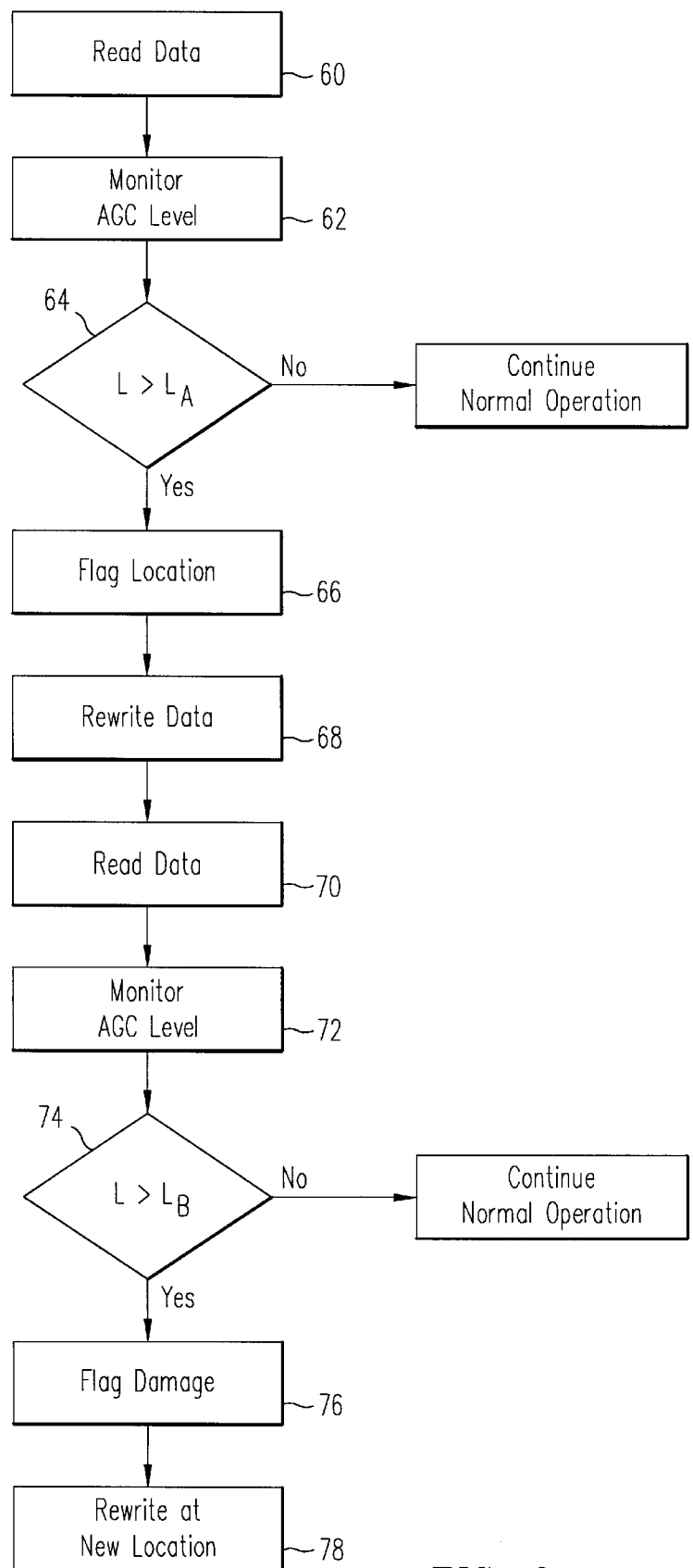
FIG. 3 is a flow diagram illustrating the steps for readback signal monitoring and limitation of disk damage according to an embodiment of the invention.

FIG. 3 is a flow diagram illustrating steps in a method for readback signal monitoring and limitation of disk damage according to an embodiment of the present invention. As described herein, readback signal monitoring may be carried out as a continuous process during normal read operations using any read head in the disk drive. Referring also to the read channel shown in FIG. 2, during a read data step 60 using selected read head 32 to read data previously written on data tracks on a disk surface, an AGC level signal 47 of an AGC circuit is continuously monitored by a first monitor AGC level step 62. The magnitude L of the AGC level signal 47 is compared with a fixed, previously chosen magnitude $L_A$ representing the maximum expected magnitude of the AGC level signal 47 for a normal read signal amplitude in a first comparator step 64. If L is equal to or smaller than $L_A$, the amplitude level of the read signal is sufficiently high that no significant read signal degradation has occurred. As long as the condition $L \leq L_A$ holds, the normal read operation is continued.

If L becomes larger than $L_A$, implying that the AGC gain has increased to compensate for a degraded read signal amplitude, a first flag step 66 results in activation of a flag in the controller to mark the data track location having degraded read signal amplitude and to store the readback data from this data track location in a buffer memory. In a rewrite data step 68, the write channel is activated and the data stored in the buffer memory is rewritten at the flagged data track location. The rewrite operation tests the flagged data track location for permanent damage to the magnetic coating on the disk due to slider/disk contact. A second read data step 70 again activates the read channel and the rewritten data at the flagged data track location is read using the read head 32. During the read operation, a second monitor AGC level step 72 continuously monitors the magnitude L of the AGC level signal 47. In a second comparison step 64, the magnitude L of the AGC level signal 47 is compared with a fixed, previously chosen magnitude $L_B$ representing an acceptable magnitude of the AGC level signal 47 for a normal read signal amplitude. If L is equal to or smaller than $L_B$, the amplitude level of the read signal of the rewritten data is acceptable implying that no significant permanent physical disk surface damage occurred at the flagged data track location. Under the condition that $L \leq L_B$, the flagged location on the data track is considered usable and the normal read operation is resumed.

If, in the second comparison step 74, L is larger than $L_B$, it is concluded that permanent physical damage at the flagged data track location has occurred making it impossible to rewrite the data at this location without an unacceptable level of signal degradation. Under this condition, a second flag step 76 causes a damage flag to be sent to the controller designating the damaged data track location as unusable. A rewrite at a new location step 78 is then initiated in which the data from the damaged data track location is rewritten at a new location on the disk surface.

An alternate embodiment of the method comprises an additional step of recording in a memory location in the disk drive a count of the number of instances a particular location on a data track is flagged during the first flag step 66 of the method. If the count for the particular location reaches a predetermined number, a damage flag is sent to the controller designating the particular location experiencing repeated signal degradation as an unusable location due to a potentially high risk for data loss. A rewrite at a new location step 78 is initiated in which the data from the particular location at high risk for data loss is rewritten at a new location on the disk or on another disk in the disk file.

In using the method of the present invention, a record may be kept, in a memory location in the disk drive, of the total count of all flagged locations on all the disk tracks that are recoverable (read signal amplitude recoverable to an acceptable level by a rewrite operation resulting in a "NO" decision in step 74). The recoverable locations are referred to as soft failure locations. Similarly, a record may be kept, in a memory location in the disk drive, of the total count of all flagged locations on all the disk tracks that are nonrecoverable (read signal amplitude not recoverable to an acceptable level resulting in a "YES" decision in step 74). The nonrecoverable locations are referred to as hard failure locations. The counts of soft and hard failures that have occurred in a disk drive may be used to judge the quality of the disk drive from a reliability perspective for predictive failure analysis (PFA) purposes.

The method of the invention provides for continuous monitoring of the read signal of the data channel to detect early signs of readback signal degradation. When read signal degradation is detected, a rewrite operation is used to determine whether the degradation is due to permanent physical damage of the disk coating or whether the degradation is the result of thermal erasure of the magnetically recorded data. Only when the signal degradation is due to permanent physical damage is the location on the data track flagged as unusable and the affected data relocated in the disk drive. Reversible signal degradation due to thermal erasure results in recovery of the signal quality by a rewrite operation and continued use of the data track location. The method provides the desired protection of stored data by limiting the effects of disk damage at a data track location while continuing to utilize the maximum usable storage capacity of the disk drive.

The method has been described for a preferred embodiment wherein the read signal amplitude level is monitored by monitoring the AGC level signal 47 from the AGC circuit 42. This method of monitoring the signal amplitude is attractive since an AGC circuit is already present in the read channel of the disk drive. Alternatively, the method may use other means of monitoring the read signal amplitude level. As an example, the amplitude of the read signal may be measured at the output of the AE circuit 34 using circuitry well known to those skilled in the art. Modifications to the comparison steps 64, 74 of the method 58 will be obvious to those skilled in the art for adapting the method 58 for this alternate read signal amplitude monitoring means. Other means for read signal monitoring may occur to those skilled in the art that may also be used in the method of the present invention.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A method of monitoring a read signal amplitude and detecting physical damage in a magnetic disk drive comprising the steps of:

reading data, written on a data track of a magnetic recording disk, with an MR element of a read head to provide a read signal;

monitoring the amplitude of the read signal in response to the data written on the data track;

comparing the monitored amplitude of the read signal with a first fixed amplitude level;

continuing to read data written on the data track if the amplitude of the read signal is greater than or equal to the first fixed amplitude level;

flagging a location on the data track if the amplitude of the read signal at the location on the data track is less than the first fixed amplitude level;

rewriting the data at the flagged location on the data track using a write head;

reading the rewritten data at the flagged location on the data track with the MR element of the read head;

monitoring the amplitude of the read signal in response to the rewritten data at the flagged location on the data track;

comparing the monitored amplitude of the read signal in response to the rewritten data with a second fixed amplitude level;

continuing to read data written on the data track if the amplitude of the read signal is greater than or equal to the second fixed amplitude level;

flagging a location on the data track with a damage flag if the amplitude of the read signal at the location on the data track is less than the second fixed amplitude level; and rewriting the data at the location having the damage flag at a new location on the magnetic recording disk.

2. A method of monitoring read signal amplitude and detecting physical damage in a magnetic disk drive comprising the steps of:

reading data, written on a data track of a magnetic recording disk, with an MR element of a read head to provide a read signal;

amplifying the read signal with an automatic gain control (AGC) circuit having an AGC amplification level to provide a fixed amplitude signal for further signal processing in a read channel;

monitoring the AGC amplification level of the AGC circuit in response to the read signal;

comparing the monitored AGC level with a first fixed magnitude $L_A$;

continuing to read data written on the data track if the AGC level is less than or equal to the first fixed magnitude $L_A$;

flagging a location on the data track if the AGC level is greater than the first fixed magnitude $L_A$;

rewriting the data at the flagged location on the disk track using a write head;

reading the rewritten data at the flagged location on the disk track with the MR element of the read head;

monitoring the AGC amplification level of the AGC circuit in response to the rewritten data at the flagged location on the disk track;

comparing the monitored AGC level of the AGC circuit in response to the rewritten data with a second fixed magnitude $L_B$;

continuing to read data written on the data track if the AGC level is less than or equal to the second fixed magnitude $L_B$;

flagging a location on the data track with a damage flag if the AGC level is greater than the second fixed magnitude $L_B$; and rewriting the data at the location on the disk track having the damage flag at a new location on the magnetic recording disk.

* * * * *